W. A. BENTON.
AUTOMATIC INDICATING WEIGHING MECHANISM.
APPLICATION FILED DEC. 17, 1915.
1,228,284.
Patented May 29, 1917.
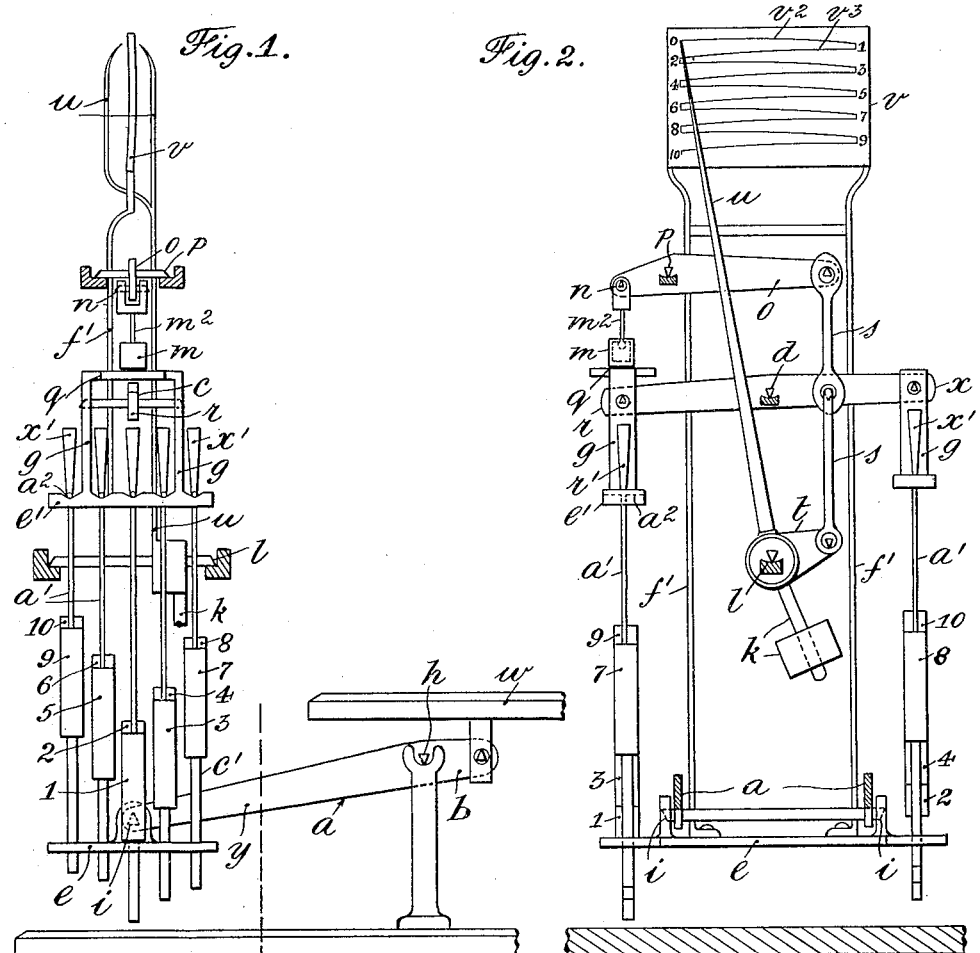
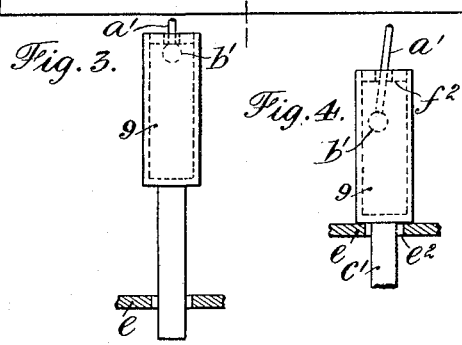
Witnesses
Inventor
William A. Benton
by
Attorney

__UNITED STATES PATENT OFFICE.__

WILLIAM ALFRED BENTON, OF BIRMINGHAM, ENGLAND.

AUTOMATIC INDICATING WEIGHING MECHANISM.

1,228,284.  Specification of Letters Patent.  Patented May 29, 1917.

Application filed December 17, 1915. Serial No. 67,470.

*To all whom it may concern:*

Be it known that I, WILLIAM ALFRED BENTON, subject of the King of Great Britain, residing at 5 Grosvenor Chambers, Broad street corner, Birmingham, in the county of Warwick, England, have invented certain new and useful Improvements in Automatic Indicating Weighing Mechanisms, of which the following is a specification.

The invention relates to a class of automatic scale or weighing mechanism in which the action of the load causes the weight pan to rise and take up suitably suspended weights until the load is balanced.

In connection with this class of weighing mechanism the invention provides a particular arrangement by which the fractional portion of the load, in excess of the number of the weight units lifted by the load, is weighed and the total amount of the weighing indicated on a dial, and also a particular arrangement of weight units and manner of bringing them into effective operation.

The invention will be clearly understood by the description hereinafter appearing with reference to the accompanying drawings representing by—

Figure 1 a side elevation of the machine less the inclosing casing, by—

Fig. 2 a front elevation part section of Fig. 1, by—

Figs. 3 and 4 side views of details, and by—

Fig. 5 a plan view of details.

The main weighing beam $a$ is divided so that the load pan $w$ is carried by the shorter arm, $b$, and the weight pan $e$ by the longer arm, $y$, which arms have a ratio in respect of each other as 1 to 5.

The fulcrum of this beam is at $h$, and the knife edge fulcrum between the weight pan and the beam is at $i$. Rigidly attached to the weight pan $e$ by the standards $f^1$ is a dial $v$ which moves up and down with said weight pan. Said beam $a$ and the parts it carries are balanced to rest indifferently in any position.

An equal armed and delicately balanced weight carrying beam $c$ is supported on the fulcrum knife edge $d$, and two series of weights, all of equal magnitude, are suspended from said beam, one series from each end $r$ and $x$, in such manner that both series of weights are above said weight pan $e$. The weights are indicated by the numerals 1 to 10, the ones 1, 3, 5, 7, and 9 forming one series, and hanging from the end $r$ of the beam $c$, and the ones 2, 4, 6, 8, and 10 forming the other series and hanging from the end $x$ of said beam, said weights being suspended so that their bases $f$ are at different distances from the weight pan $e$. Frames $g$ $g$ serve for the efficient suspension of the weights from the beam ends.

The suspension arrangement for each weight from the frame $g$ is by a rod $a^1$ supported on a pivot $a^2$ rocking in a suitable recess or nest of a cross bar $e^1$ of said frame, each rod having at its lower end a button $b^1$ and being counter-balanced as regards its own weight and the weight of the button by a perpendicular weighted arm $x^1$. The rod $a^1$ holds up the particular weight (each weight is hollow) by the button $b^1$ engaging against the underside $f^2$ of the top of said weight. When the weight pan $e$ rises to lift the weight the suspension rod $a^1$ is frictionally free of said weight, as shown by Fig. 4. The stem $c^1$ of the weight is always free in a narrow slot $e^2$ of the weight pan. Fig. 3 shows how a weight is suspended by the rod $a^1$.

As regards the two series of suspended weights the weight carrying beam $c$ is equally loaded and exactly balanced. Each weight taken up by the weight pan $e$ will exactly balance one weight unit of load on the load pan $w$. The weighing machine shown is a ten pound capacity one, each weight representing one pound.

The weight carrying beam $c$ is so positioned with regard to a lever $o$ fulcrumed on the knife edge $p$ that a hollow counter weight $m$, hanging by the rod end 2 from a knife edge, $n$, on said lever, may fall upon a rigid table $q$ of one of the frames $g$ to raise the other end of said lever $o$ which lever is connected by straps $s$ to an arm $t$ of a pendulum balance, $k$, working on the knife edge, $z$, and carrying the pointer $u$. When the counter weight $m$ hangs the pendulum balance $k$ is raised to its highest position as shown in the drawings to offer its maximum resistance, the entire lever system $o$ being in a state of equilibrium with the pointer $u$ giving zero indication on the dial $v$. The counter weight $m$, when the pointer is in such position, does not quite touch the table $q$ and the lowest weight 1 does not quite touch the weight pan $e$. If a load be now placed on the load pan $w$ it will cause the weight pan $e$ to lift the weight 1 and disturb the equilibrium of the pendulum balance $k$ by lifting the counter weight $m$. To this lifting action the pendulum counter-weight $k$ presents a gradually decreasing resistance until the counter weight $m$ has been entirely lifted and the pendulum $k$ hangs free in its lowest position. As the counter weight $m$ is exactly equal in weight to each of the suspended weights the weight carrying beam $c$ will again be in equilibrium although the weight pan has risen to approach the base of the weight 2, whose base will now be but a little distance away from said weight pan. The pointer will in the meantime have moved over the dial on the line $v^2$ to indicate one pound. If the load on the load pan $w$ is as yet unbalanced the weight pan $e$ will continue to lift and the hanging weight 2 will be lifted in turn, but not until the weight pan $e$ has traversed the small space existing between it and the base of the hanging weight 2, which traverse continues the lift of the dial so that by the time the weight 2 is actually lifted the pointer will take up a position at the right hand extremity of the indication line $v^3$ on the dial. The moment the weight pan begins to lift the weight 2 the equilibrium of the weight carrying beam $c$ will again be disturbed and the end $r$ of said beam, still supporting the counter weight $m$, will begin to fall causing an instant reaction on the counter weight pendulum system $k$, until the whole of the counter weight $m$ acts upon the pendulum resistant when the pointer $u$ will have moved back over the dial along the line $v^2$ to indicate two pounds.

The other members of the two series of hanging weights are taken up alternately by the gradual rising of the weight pan $e$, the lowest weight lifted always acting in coordination with the counter weight pendulum system $k$ so that the fractional portion of the load is weighed through the latter; it following, from the fact that the movements of the weight carrying beam $c$ are in a sense controlled by the counter weight pendulum system $k$, that a point of equilibrium exists for any load on the load pan up to the limits of the machine's capacity.

In the operation of the machine the dial $v$ will always be raised in proportion to the load on the load pan $w$. If a maximum load be gradually built up by the continued addition of minute increments the dial $v$ will be gradually raised and the pointer $u$ will gradually move to and fro across the dial $v$ to always take up a position indicative of the true load, and to always indicate the correct number of units of load whenever the pointer is at either end of its to and fro movement across the dial. In this position of the pointer, a negligible increment of load causes a vertical movement of the dial before the pointer reverses its motion, which vertical movement is due to the fact that at the moment when the weight of the counter weight $m$ has been entirely taken on the counter weight table $q$ the weight pan $e$ must ascend a short distance before it comes into contact with the next hanging weight, during which movement the scale beam is not encountering any resistance, the weight carrying beam being in equilibrium. Similar conditions apply to the return movement of the weight carrying beam $c$, namely, during the moment following that in which the entire weight of the counter weight $m$ has been caused to affect the pendulum.

The unit figures are placed at the turning points of the zig-zag track, and may be colored to correspond with the fractional traverse to which they belong. Thus, if the 6 lbs. division mark and its accompanying number are blue the fractional track between the 6 lbs. and 7 lbs. division marks may also be colored blue. A window in the casing may be appropriately shaped to show only that portion of the track necessary for correct reading, and a direction may be put upon the casing in some such terms as these in the case of counter scales: "When the pointer is between two pound divisions always read the lower pound; when the pointer is between two ounce divisions always read the lower ounce number." Arrows may be placed near the track on alternate traverses to indicate the direction of increase of weight values in the indications.

Having now described my invention what I claim and desire to secure by Letters Patent is:—

1. An automatic weighing mechanism, comprising a load receiver, a weight-pan, means whereby said weight-pan is adapted to be raised and lowered by the load receiver, a dial, means connecting the dial to the weight-pan whereby the dial is movable with the weight-pan, a plurality of balanced weights arranged to be successively lifted by the movement of said weight-pan and thereby disturb the balance of said weights, balancing means supporting said weights, counter-weight means coöperating with the balanced weights to restore the balance of said weights, and a pointer coöperating with the dial and having an operative connection with the counter-weight means whereby the pointer is operated to indicate upon the dial the weight on the load receiver.

2. An automatic weighing mechanism, comprising, a load receiver, a weight-pan adapted to be raised and lowered by the load receiver, a dial, means connecting the dial to the weight-pan whereby the dial is movable with the weight-pan, a plurality of balanced weights arranged to be successively lifted by the rise of the weight-pan thereby disturbing the balance of said weights, balancing means supporting said weights, an indicating pointer arranged to coöperate with the dial, and balanced counter-weight means independent of said first mentioned balanced weights and arranged to operate to restore at all times the balance of the latter weights, said counter-weight means having a connection with said pointer for operating the latter to indicate upon the dial the weight on the load receiver.

3. An automatic weighing mechanism, comprising, a scale beam, a load receiver on said scale beam, a weight-pan on the scale beam and adapted to be raised and lowered by the load receiver, a dial, means connecting the dial to the weight-pan whereby the former is movable with the latter, a balanced weight beam, a plurality of weights of equal weight supported from each end of said beam, said weights being arranged so that the weights on each end of said beam are successively lifted in alternation by the weight-pan thereby disturbing the balance of the weight beam, balanced counter-weight means arranged to be effected by the position of said weight beam and to restore the latter to its balanced position, and a pointer arranged to coöperate with the dial and actuated by the movement of said counter-weight means to indicate upon the dial the weight on said load receiver.

4. An automatic weighing mechanism, comprising, a load receiver, a weight-pan adapted to be raised and lowered by the load receiver, a dial, means connecting the dial to the weight-pan for rendering the dial movable with the weight-pan, a plurality of balanced weights arranged to be alternately and successively engaged and lifted by the weight-pan when a load is on the load received thereby disturbing the balance of said weights, a balanced counter-weight means coöperating with said first mentioned balanced weights to restore at all times the balance of the latter, and a pointer to coöperate with said dial to indicate the weight on said load receiver and actuated by the movement of said counter-weight means to move over said dial, said first mentioned weights being arranged relatively to the weight-pan to permit an idle lift of the dial previous to the lift of each succeeding weight.

5. An automatic weighing mechanism, comprising a scale beam, a load receiver on one end of the scale beam and a weight-pan on the other end thereof, a balancing weight beam, a plurality of weights of equal weight supported from each end of the weight beam, the weights on each end of the weight beam being arranged to be successively lifted from the beam in alternation by the weight-pan to disturb the equilibrium of said beam, a third balancing beam, a counter-balancing means carried by one end of said third beam, means associated with one end of the weight beam and coöperative with said counter-balancing means to at all times restore the balance of said weights, a dial, a pointer coöperating with said dial to indicate the weight on the load receiver, and means associated with the other end of said third beam whereby relative movement is imparted to the pointer and the dial by the movement of said counter-balancing means.

In testimony whereof I have hereunto set my hand in presence of two subscribing witnesses.

WILLIAM ALFRED BENTON.

Witnesses:
  GEO. FUERY,
  D. LEAKER.

Copies of this patent may be obtained for five cents each, by addressing the "Commissioner of Patents, Washington, D. C."